United States Patent
Litwinowicz et al.

(10) Patent No.: US 9,250,629 B2
(45) Date of Patent: Feb. 2, 2016

(54) TERRAIN ADAPTIVE FLIGHT CONTROL

(71) Applicant: Sikorsky Aircraft Corporation, Stratford, CT (US)

(72) Inventors: Anthony Litwinowicz, Derby, CT (US); Vineet Sahasrabudhe, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 243 days.

(21) Appl. No.: 14/243,582

(22) Filed: Apr. 2, 2014

(65) Prior Publication Data
US 2015/0286214 A1   Oct. 8, 2015

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G08G 5/04 | (2006.01) |
| B64C 27/04 | (2006.01) |

(52) U.S. Cl.
CPC .............. *G05D 1/0055* (2013.01); *B64C 27/04* (2013.01); *G08G 5/04* (2013.01)

(58) Field of Classification Search
CPC . G05D 1/0255; G05D 1/0219; G05D 1/0227; G05D 1/0242; G05D 1/0072; G05D 1/0005; G05D 1/0011; G05D 1/0027; G05D 1/0038; G05D 1/0016; G08G 5/0021; G08G 5/0095; G08G 5/0034; G08G 5/06; G08G 5/025; G08G 5/04; G08G 5/0043; G08G 5/02; G08G 5/095
USPC ......... 701/3, 25, 53, 50, 51, 1, 67, 22, 23, 18, 701/26, 11, 14, 2, 7, 400, 203; 244/105, 244/12.2, 17.9, 47, 14, 220
See application file for complete search history.

(56) References Cited

U.S. PATENT DOCUMENTS

| | | | | |
|---|---|---|---|---|
| 3,568,187 | A * | 3/1971 | Bechtel et al. | 342/65 |
| 4,987,413 | A * | 1/1991 | Grove | 340/970 |
| 5,666,110 | A | 9/1997 | Paterson | |
| 6,021,374 | A * | 2/2000 | Wood | 701/301 |
| 6,085,129 | A * | 7/2000 | Schardt et al. | 701/14 |
| 6,480,789 | B2 * | 11/2002 | Lin | 701/301 |
| 6,583,733 | B2 * | 6/2003 | Ishihara et al. | 340/946 |
| 7,418,320 | B1 * | 8/2008 | Bodin et al. | 701/26 |
| 7,460,029 | B2 * | 12/2008 | Boorman et al. | 340/975 |
| 7,551,990 | B2 * | 6/2009 | Khatwa | 701/9 |
| 7,751,976 | B2 | 7/2010 | Matuska et al. | |
| 7,839,322 | B2 * | 11/2010 | Filias et al. | 342/33 |
| 7,970,502 | B2 * | 6/2011 | Boorman et al. | 701/11 |
| 8,234,023 | B1 * | 7/2012 | Wichgers et al. | 701/9 |
| 8,244,455 | B2 * | 8/2012 | Case et al. | 701/417 |
| 8,280,622 | B2 * | 10/2012 | Meunier et al. | 701/301 |
| 8,509,965 | B2 * | 8/2013 | Lin | 701/3 |
| 8,612,132 | B2 * | 12/2013 | Oberti et al. | 701/301 |

(Continued)

*Primary Examiner* — Calvin Cheung
*Assistant Examiner* — Luis A Martinez Borrero
(74) *Attorney, Agent, or Firm* — Cantor Colburn LLP

(57) ABSTRACT

A helicopter is provided and includes an air frame formed to accommodate a pilot, flight control elements disposed on the airframe to generate lift and thrust in accordance with control commands issued by the pilot and a current control mode, a sensor disposed on the airframe to sense helicopter proximity to terrain and obstacles and a flight computer configured to change the current control mode based on sensed helicopter proximity to the terrain and the obstacles.

15 Claims, 3 Drawing Sheets

(56) References Cited

U.S. PATENT DOCUMENTS

| | | | |
|---|---|---|---|
| 8,897,935 B2 * | 11/2014 | Meunier et al. | 701/9 |
| 8,970,423 B2 * | 3/2015 | Kabrt et al. | 342/29 |
| 9,037,391 B2 * | 5/2015 | Meyer et al. | 701/301 |
| 2001/0056316 A1 * | 12/2001 | Johnson et al. | 701/14 |
| 2004/0181318 A1 * | 9/2004 | Redmond et al. | 701/9 |
| 2005/0178903 A1 * | 8/2005 | Boorman et al. | 244/118.5 |
| 2006/0091654 A1 * | 5/2006 | De Mersseman et al. | 280/735 |
| 2007/0050140 A1 * | 3/2007 | Matuska et al. | 701/301 |
| 2008/0140267 A1 * | 6/2008 | Matuska et al. | 701/3 |
| 2008/0184906 A1 * | 8/2008 | Kejha | 102/374 |
| 2008/0243383 A1 * | 10/2008 | Lin | 701/213 |
| 2009/0292408 A1 * | 11/2009 | Shafaat et al. | 701/4 |
| 2010/0004802 A1 * | 1/2010 | Bodin et al. | 701/11 |
| 2010/0042273 A1 | 2/2010 | Meunier et al. | |
| 2010/0299067 A1 * | 11/2010 | McCollough et al. | 701/301 |
| 2010/0305784 A1 | 12/2010 | Anderson et al. | |
| 2011/0006943 A1 * | 1/2011 | Shaffer | 342/146 |
| 2011/0130913 A1 * | 6/2011 | Duggan et al. | 701/23 |
| 2012/0203450 A1 * | 8/2012 | Meyer et al. | 701/301 |
| 2012/0215385 A1 * | 8/2012 | He et al. | 701/3 |
| 2013/0124020 A1 * | 5/2013 | Duggan et al. | 701/3 |

* cited by examiner

US 9,250,629 B2

TERRAIN ADAPTIVE FLIGHT CONTROL

STATEMENT OF GOVERNMENT RIGHTS

This invention was made with government support with the United States Army under Contract No. W911W612. The government therefore has certain rights in this invention.

BACKGROUND OF THE INVENTION

The subject matter disclosed herein relates to terrain adaptive flight control and, more particularly, to terrain adaptive flight control where a type of control mode is changed based on proximity to terrain or obstacles.

In aircraft flight control systems, controlled flight into terrain (CFIT) occurs when an aircraft, such as a helicopter, impacts terrain or an obstacle in its flight path even though the aircraft is operating normally. This type of incident is common and, in fact, CFIT is a leading cause in helicopter crashes. Occurrence of CFIT is especially a problem when flying in instrument flight rules (IFR) conditions or at night where the pilot wears night vision goggles. Currently, terrain avoidance systems only cue the pilot as to ground proximity.

BRIEF DESCRIPTION OF THE INVENTION

According to one aspect of the invention, a helicopter is provided and includes an air frame formed to accommodate a pilot, flight control elements disposed on the airframe to generate lift and thrust in accordance with control commands issued by the pilot and a current control mode, a sensor disposed on the airframe to sense helicopter proximity to terrain and obstacles and a flight computer configured to change the current control mode based on sensed helicopter proximity to the terrain and the obstacles.

According to another aspect of the invention, a helicopter flight control method is provided and includes scanning terrain for obstacles in a flight path of a helicopter, detecting that an obstacle is in the flight path and determining whether a distance between the helicopter and the obstacle is less than a predefined distance and changing a flight control mode in accordance with a result of the determining.

According to yet another aspect of the invention, a helicopter flight control method is provided and includes scanning terrain for obstacles in a flight path of a helicopter, in an event that an obstacle is not detected, setting an attitude command velocity hold (ACVH) mode as a current flight control mode, in an event that an obstacles is detected, determining a distance between the obstacle and the helicopter is less than a predefined distance for engagement of a translational rate command (TRC) mode, setting the TRC mode in an event that the distance is less than the predefined distance and setting the ACVH mode in an event that the distance is not less than the predefined distance.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to methods and systems to reduce the possibility of CFIT by making aircraft flight controls aware of surrounding terrain and automatically changing the type of control mode based on the aircraft's proximity to the terrain or obstacles in its flight path. In the case that an aircraft's control mode is attitude command velocity hold (ACVH), the trim velocity reference can be limited based on the aircraft's proximity to the terrain or the obstacles in its flight path. The trim velocity would transition to zero as the aircraft approaches, for example, an obstacle. At this point, the control mode transitions to a translational rate command (TRC) type mode where the trim stick position is a position hold mode.

Figure 1:
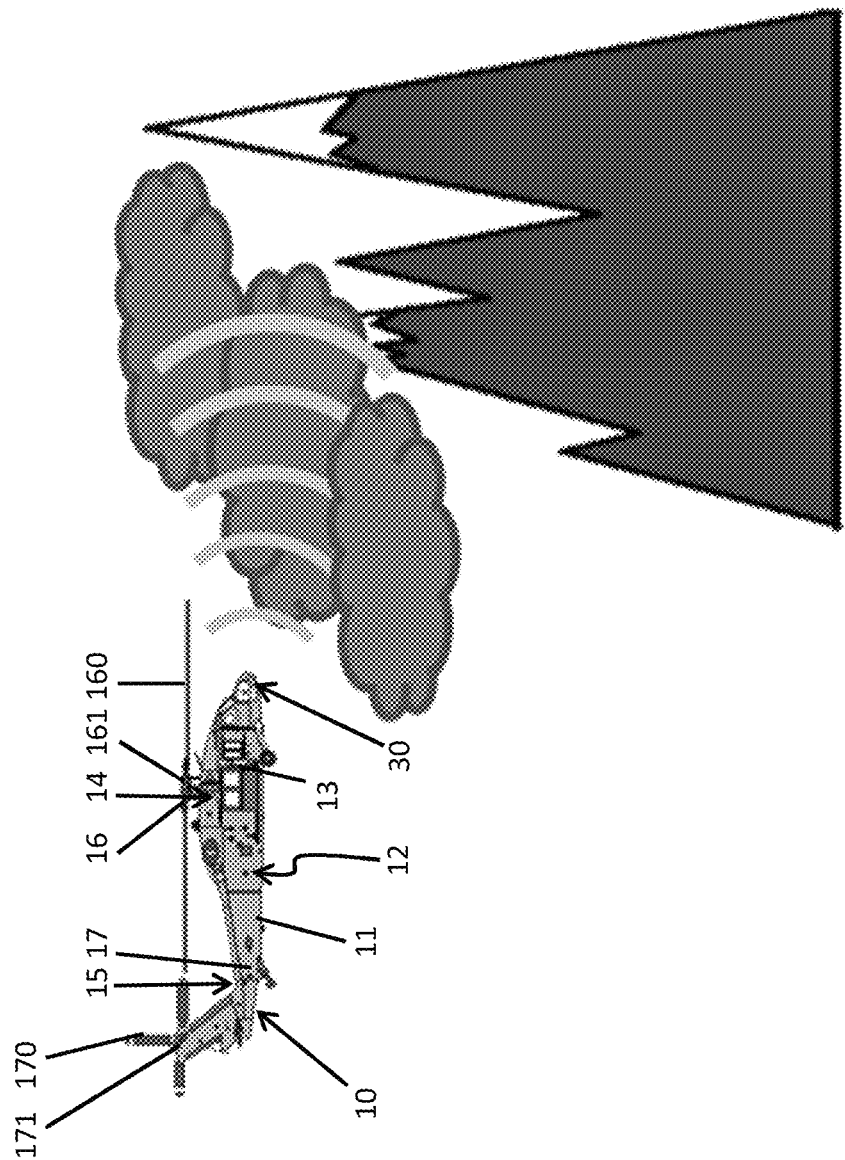
FIG. 1 is a schematic view of an aircraft flight.
Figure 2:
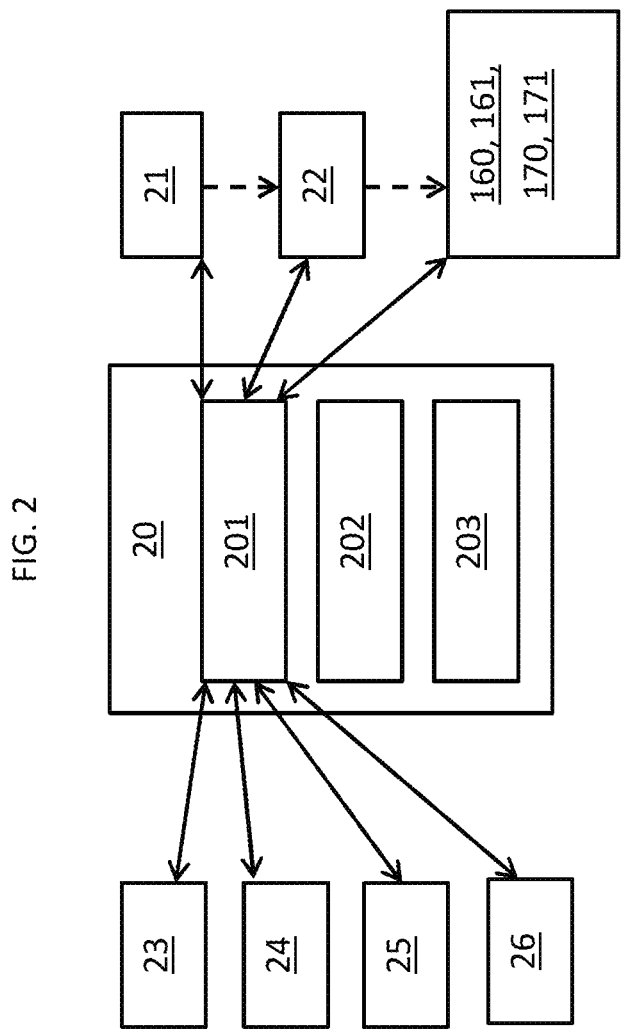
FIG. 2 is a schematic view of aircraft flight control systems.

With reference to FIGS. 1 and 2, an aircraft 10 is provided. As shown in FIG. 1, the aircraft 10 may be a helicopter 11 having an air frame 12 that is formed to define a cabin 13, a top portion 14 and a rear portion 15. The airframe 12 includes a main rotor section 16 at the top portion 14, a tail rotor section 17 at the rear portion 15 and a sensor 30. The main rotor section 16 is rotatably supportive of a main rotor 160 that includes a set of rotor blades coupled to a hub 161 and rotates relative to the airframe 12 to thereby provide for thrust and lift of the helicopter 11. The tail rotor section 17 is rotatably supportive of a tail rotor 170 that includes a set of rotor blades coupled to a hub 171 and rotates relative to the air frame 12 in a plane that is generally transverse to the plane of the main rotor 160. The rotation of the tail rotor 170 provides for yaw control of the helicopter 11.

The cabin 13 is sized to accommodate a flight computer 20 and at least a pilot and, in some cases, one or more additional crewmen and/or passengers. The top portion 14 of the air frame 12 is sized to accommodate an engine 21 and a transmission 22. The engine 21 drives the rotation of the main rotor 16 and the tail rotor 17 by way of the transmission 22 and in accordance with commands issued by the flight computer 20. Those commands are generally derived from corresponding control commands issued by the pilot and may take the form of cyclic commands issued by the pilot via a control stick 23, collective commands issued by the pilot via a collective lever 24, torque commands issued by the pilot via pedals 25 to control a yaw rate of the helicopter 11 and throttling commands issued by the pilot via a throttle 26 to control power produced by the engine 21.

The cyclic commands change the pitch angle of the rotor blades of the main rotor 160 cyclically as they rotate around the hub 161 so that all blades will have the same angle of incidence at the same point in the cycle. The cyclic commands cause the blades to fly up or down in sequence with the result being that the disk of the main rotor 160 tilting and producing thrust in a given direction. The collective commands change the pitch angle of all the main rotor 160 blades at the same time and independent of their position with the result being an increase or decrease in lift.

The sensor 30 is disposed on the air frame 12 to sense a terrain surrounding the helicopter 11 and/or obstacles lying in the flight path of the helicopter 11 (e.g., mountains, trees, power lines, vehicles, buildings, other aircraft, etc.). The sensor 30 may include one or more imaging sensors arrayed around the helicopter 11. The imaging sensors may be laser imaging, detection and ranging (LIDAR) sensors or radio detection and ranging (RADAR) sensors. Data generated by the sensor 30 may be used to generate a picture of the terrain and obstacles alone or may be used in conjunction with a digital terrain and elevation data (DTED) database.

As shown in FIG. 2, the control stick 23, the collective lever 24, the pedals 25 and the throttle 26 are operably coupled to the flight computer 20 such that pilot commands inputs to the control stick by the pilot can be interpreted by the flight computer 20 and converted into servo commands of the engine 21, the transmission 22, the main rotor 160, the tail rotor 170 and the hubs 161 and 171 to provide the pilot with control of the flight of the helicopter 11.

The flight computer 20 includes a processing unit 201, a transmitting unit 202 and a memory unit 203. The transmitting unit 202 communicates with the control stick 23, the collective lever 24, the pedals 25 and the throttle 26 to receive pilot commands and with the engine 21, the transmission 22, the main rotor 160, the tail rotor 170 and the hubs 161 and 171 to issue the servo commands. The transmitting unit 202 is coupled to the processing unit 201 and thereby responsive to instructions issued by the processing unit 201. The memory unit 203 may include the DTED database and has executable instructions stored thereon, which, when executed, cause the processing unit 201 to interpret data received at the transmitting unit 202 and to convert that data into the servo commands.

In accordance with embodiments, the conversion of the data into the servo commands by the processing unit 201 is associated with a current flight control mode of the helicopter 11. As an example, a first control mode of the helicopter 11 may be an attitude command velocity hold (ACVH) mode in which helicopter 11 attitude is directly proportional to the control stick 23 displacement from center and provides for reduced pilot workload especially in a degraded visual environment. As another example, a second control mode of the helicopter 11 may be a translational rate command (TRC) mode in which longitudinal or lateral deflections of the control stick 23 directly control a longitudinal or lateral translational rate along the axis of pitch or roll.

When executed, the executable instructions also cause the processing unit 201 to derive terrain and obstacle data from the sensor 30 and the DTED database where available. In accordance with embodiments, the derived terrain and obstacle data is analyzed by the processing unit 201 such that a control mode of the helicopter 11 can be changed to avoid incidences of CFIT. That is, the helicopter flight controls (i.e., the flight computer 20 and the processing unit 201) would become aware of the terrain and obstacles and automatically change the type of control mode available to the pilot based on helicopter 11 proximities to such terrain or obstacles. In the case that the helicopter 11 is currently in the ACVH mode, a trim velocity reference can be limited based on the proximity of the helicopter 11 to an obstacle. The velocity reference limit would transition to zero as the helicopter 11 approaches the obstacle at which point the control mode would essentially transition to the TRC mode. Upon such transition, the trim stick position is regarded as a position hold mode with the same principle be applied in the collective axis.

Figure 3:
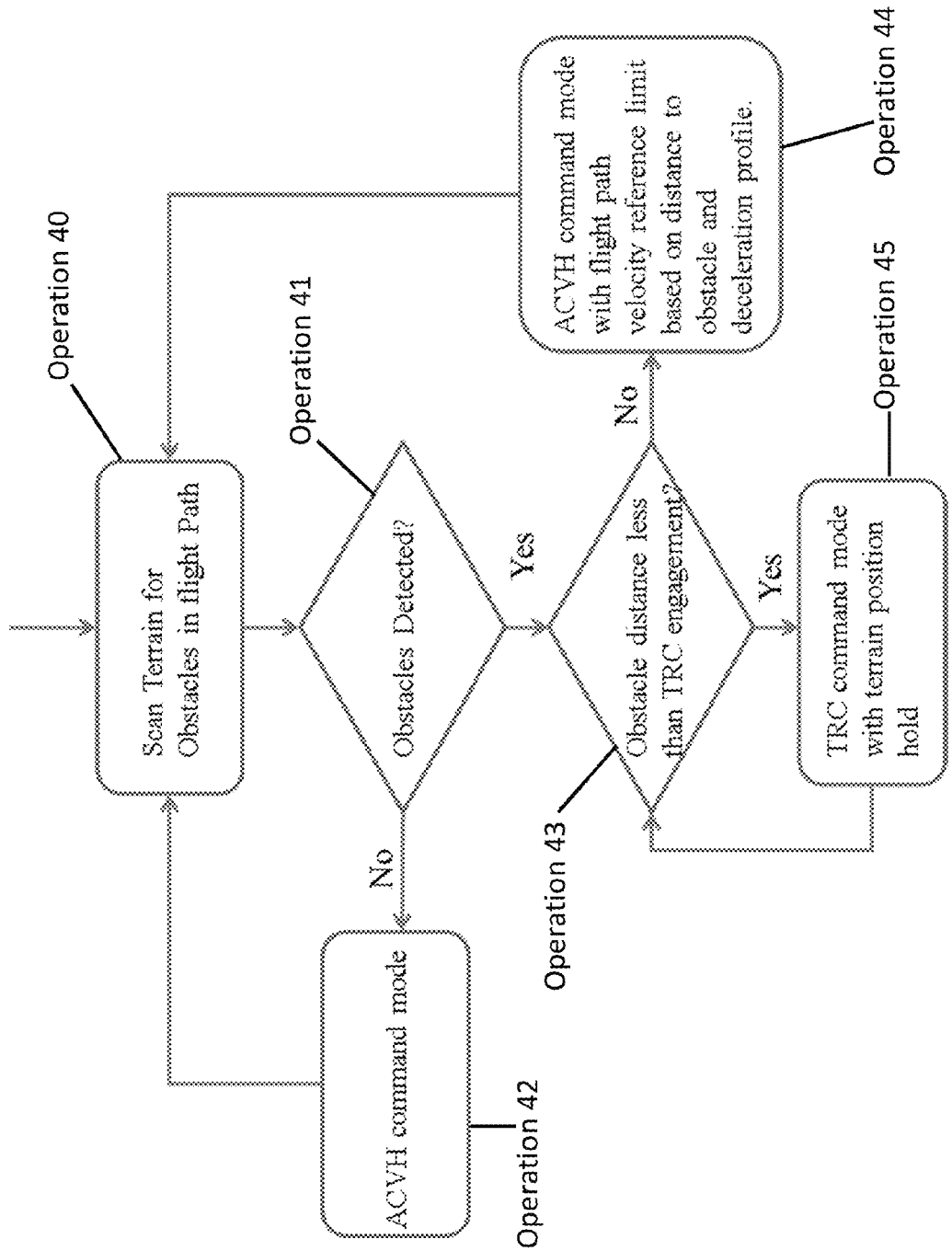
FIG. 3 is a flow diagram illustrating a method of operating terrain adaptive flight control.

With reference to FIG. 3, an algorithm provided by the execution of the executable instructions includes an initial operation of scanning terrain for obstacles in a flight path of the helicopter 11 (operation 40). In an event that obstacles are not detected (operation 41), the flight control mode is set in the ACVH mode (operation 42) and control proceeds to operation 40. In an event that obstacles are detected in operation 41, the processing unit 201 determines whether the obstacle distance to the helicopter 11 is less than a predefined distance for TRC mode engagement (operation 43). In an event that the obstacle distance to the helicopter 11 is determined to not be less than the predefined distance for the TRC mode engagement in operation 43, the flight control mode is set in the ACVH mode with flight path velocity reference limit based on the distance to the obstacle and a deceleration profile stored in the memory unit 203 (operation 44) and control proceeds to operation 40. In an event that the obstacle distance to the helicopter 11 is determined to be less than the predefined distance for the TRC mode engagement in operation 43, the flight control mode is set in the TRC mode with terrain position hold (operation 45) and control proceeds to operation 43.

In flight conditions in which instrument flight rules (IFR) are in effect, incidences of CFIT are prevented when the pilot has his hands off the stick. As the helicopter 11 approaches an obstacle, however, the flight computer 20 of the helicopter 11 would automatically transition to a hover state based on proximity of the helicopter 11 to terrain in all axes. In this case, the sensor 30 continuously senses a proximity of the helicopter 11 to the obstacle and uses feedback controls to hold and maintain a position of the helicopter 11 steady relative to the location of the obstacle. While the helicopter 11 can employ such feedback controls and additionally rely on a combination of radar altimeter and GPS feedback information, previous aircraft might have used only the radar altimeter and GPS feedback information. As the pilot flies away from the terrain, the trim velocity reference available would increase. Such capabilities could be of great benefit in search and rescue (SAR) type missions where it is necessary to fly up to and hold position next to the side of a cliff or mountain for a rescue.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A helicopter, comprising:
  an air frame formed to accommodate a pilot;
  flight control elements disposed on the airframe to generate lift and thrust in accordance with servo commands derived from control commands issued by the pilot and a current control mode associated with a conversion of data reflective of the control commands into the servo commands;
  a sensor disposed on the airframe to sense helicopter proximity to terrain and obstacles; and
  a flight computer configured to change the current control mode based on sensed helicopter proximity to the terrain and the obstacles.

2. The helicopter according to claim 1, wherein the flight control elements comprise a main rotor, a tail rotor and hubs associated with the main rotor and the tail rotor.

3. The helicopter according to claim 1, wherein the sensor comprises a laser imaging, detection and ranging (LIDAR) sensor.

4. The helicopter according to claim 1, wherein the sensor comprises a radio detection and ranging (RADAR) sensor.

5. The helicopter according to claim 1, wherein the current control mode comprises an attitude command velocity hold (ACVH) mode in which helicopter attitude is directly proportional to control stick displacement from center.

6. The helicopter according to claim 1, wherein the current control mode comprises a translational rate command (TRC) mode in which longitudinal or lateral control stick deflections directly control a helicopter translational rate.

7. The helicopter according to claim 1, wherein the current control mode comprises a translational rate command (TRC) mode with terrain position hold.

8. A helicopter flight control method for use with a helicopter including a sensor, flight control elements and a flight computer, the method comprising:
   operating the sensor to scan terrain for obstacles in a flight path of the helicopter;
   operating the flight computer such that the flight computer detects that an obstacle is in the flight path from a result of the scan, determines whether a distance between the helicopter and the obstacle is less than a predefined distance and changes a flight control mode in accordance with a result of the determining; and
   configuring the flight computer to associate the flight control mode with a conversion of data reflective of pilot inputted control commands into servo commands of the flight control elements.

9. The method according to claim 8, wherein the predefined distance is set in accordance with a translational rate command (TRC) mode engagement.

10. The method according to claim 8, further comprising operating the flight computer such that the flight computer sets the flight control mode to an attitude command velocity hold (ACVH) mode in an event that no obstacle is detected in the flight path.

11. The method according to claim 10, wherein a changing of the flight control mode by the flight computer comprises changing the flight control mode from the (ACVH) mode to the (ACVH) mode with a flight path velocity reference limit based on the distance and a deceleration profile in the event the obstacle is detected in the flight path and the distance is not less than the predefined distance.

12. The method according to claim 10, wherein a changing of the flight control mode by the flight computer comprises changing the flight control mode from the (ACVH) mode to a translational rate command (TRC) mode with terrain position hold in the event the obstacle is detected in the flight path and the distance is less than the predefined distance.

13. A helicopter flight control method for use with a helicopter including a sensor flight control elements and a flight computer, the method comprising:
   operating the sensor to scan terrain for obstacles in a flight path of the helicopter;
   operating the flight computer such that the flight computer detects that an obstacle is not in the flight path and sets an attitude command velocity hold (ACVH) mode as a current flight control mode, detects that an obstacles is in the flight path and determines a distance between the obstacle and the helicopter is less than a predefined distance for engagement of a translational rate command (TRC) mode, determines that the distance is less than the predefined distance and sets the TRC mode and determines that the distance is not less than the predefined distance and sets the ACVH mode; and
   configuring flight computer to associate the ACVH and TRC modes with respective conversions of data reflective of pilot inputted control commands into servo commands of the flight control elements.

14. The method according to claim 13, wherein the setting of the TRC mode by the flight computer comprises setting the TRC mode with terrain position hold and the setting of the ACVH mode comprises setting the ACVH mode with a flight path velocity reference limit based on the distance and a deceleration profile.

15. The method according to claim 13, further comprising operating the flight computer to maintaining a distance between the helicopter and the obstacle using sensor feedback information.

* * * * *